Jan. 16, 1968   H. MIRTAIN ETAL   3,363,660
ASYMMETRIC PNEUMATIC TIRES
Filed May 18, 1966   2 Sheets-Sheet 1

INVENTORS
HENRI MIRTAIN
ANDRÉ DEVIENNE
BY Norbert P. Holler
ATTORNEY

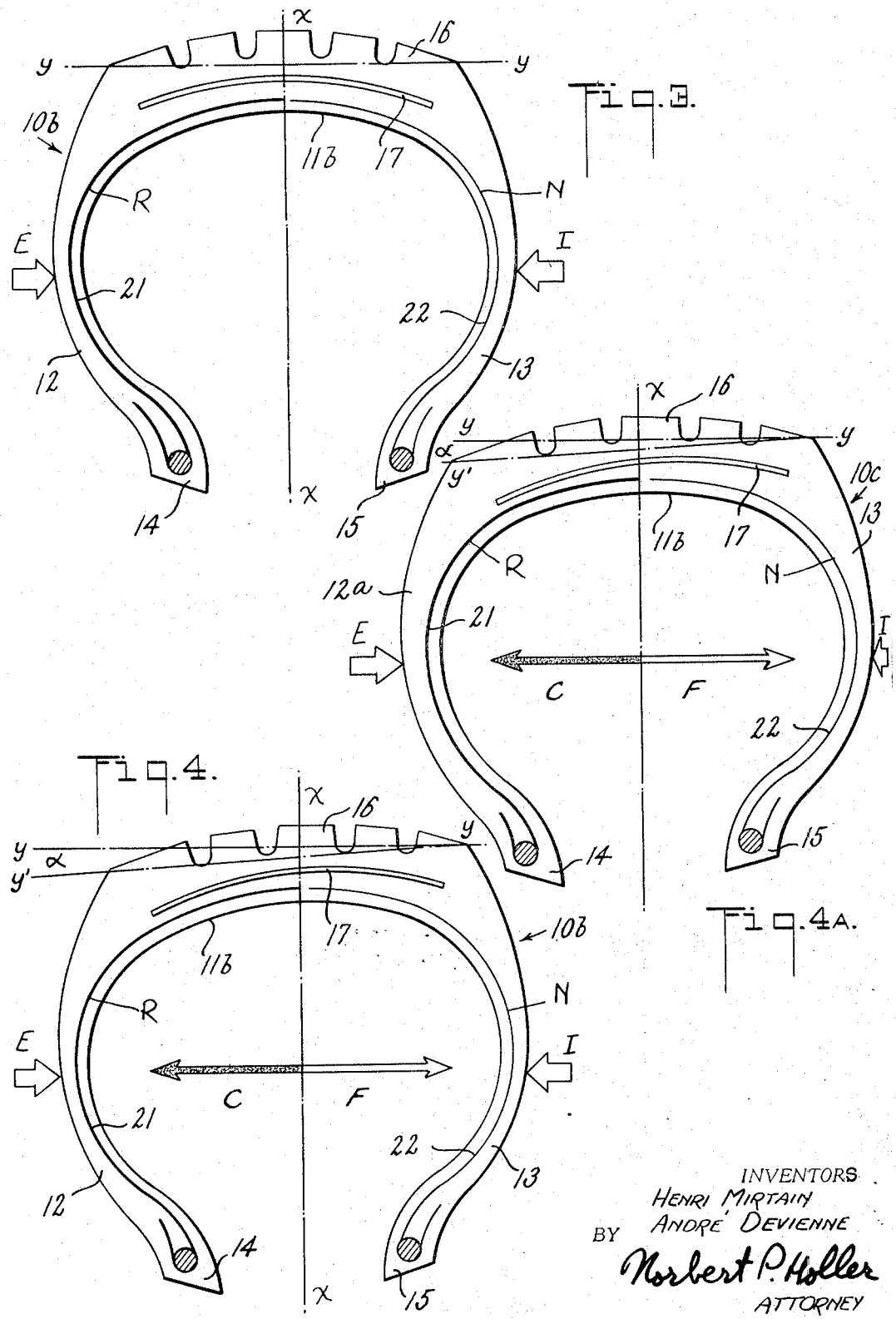

3,363,660
ASYMMETRIC PNEUMATIC TIRES
Henri Mirtain and André Devienne, Compiègne, France, assignors to Societe Francaise du Pneu Englebert, Oise, France, a corporation of France
Filed May 18, 1966, Ser. No. 551,003
Claims priority, application France, June 1, 1965, 19,085
10 Claims. (Cl. 152—353)

This invention relates to pneumatic tires for vehicles, and more particularly, to the type of tires generally called radial or radial ply tires.

The expressions "radial tires" and "radial ply tires" as commonly used in the pneumatic tire art may be said to include various tire constructions having one or more reinforcement plies of weftless cord fabric extending from bead to bead wherein the cords in each ply are substantially radial in orientation, i.e., the cords are oriented substantially normal to the beads and the crown centerline of the tire. In a monoply radial tire construction, the cords normally have a 90° bias angle, i.e., in the unshaped carcass they extend perpendicular to the planes of the beads. In a two-ply radial tire construction, the cords in each body ply are usually oriented at oppositely disposed small angles of up to 10° with respect to the perpendicular to the bead planes, in which case the respective body plies are said to have oppositely disposed bias angles of 80° or greater (but less than 90°). In four-ply or heavier radial tire constructions, similar opposed orientation of the cords in successive body plies is usually employed. All of these body or carcass constructions are contemplated within the scope and meaning of the expressions "radial" and "substantially radial" as used herein.

The present invention stems from the recognition of the fact that tires are not always rigorously uniform. That is to say, tires are found to have both radial and lateral variations in uniformity. Even without taking into account the radial and lateral eccentricity resulting from generally accepted tolerances in the wheel rims on which tires are mounted, therefore, these variations in the uniformity of the tire cause the tire and rim combination viewed as a whole to have variations of radial and lateral forces. This applies even in the case of radial ply tires in which a breaker or belt is incorporated in the tire between the crown region of the carcass and the surrounding tread band.

We have now discovered that apart from the above-mentioned variations in uniformity resulting from the structure and manufacture of the tire, an effective lateral force on the tire may also exist due to the reaction between the tire and the ground. This force, which will hereinafter be referred to as the lateral slip force, generally has two components, (a) a force due to the structure of the tire itself, hereinafter designated by the term "force of structure" and symbol F, and (b) a force resulting from the geometry of the tire, hereinafter designated by the term "force of conicity" and symbol C.

The force of structure F is always directed in the same direction for any given tire irrespective of the direction of mounting thereof on the wheel rim, and its direction results from the orientation of the generally inextensible metal wires constituting the cord elements of the outermost reinforcing ply of the breaker or belt placed under the tread. The force of conicity C, however, usually is directed sometimes in one direction and sometimes in another, depending on the direction of rotation of the tire.

The total lateral force L thus is given by the equation (1) $\quad L=(\pm F)+(\pm C)$ from which it will be seen that if for a given (say, the positive) direction of rotation of the tire both the force of structure F and the force of conicity C are positive, the total lateral force is (2) $\quad L=+F+(+C)=F+C$ Thus, the effects of the two forces are added. In the reverse (i.e., the negative) direction of rotation of this same tire, the force of structure F is still positive, but the force of conicity C is now negative, whereby the resultant, i.e., the total lateral force, is expressed by the relation (3) $\quad L=+F+(-C)=F-C$ L thus is lower when the tire rotates in the negative direction than when it rotates in the positive direction.

We have further discovered that the total lateral slip force L is an important factor in the cornering ability of the vehicle on which such tires are mounted. Thus, for example, if at the front of such a vehicle the sum of the lateral forces of the two tires, which sum may be as high as 2 L, exceeds a certain value, the vehicle tends to pull to the right or to the left depending on the direction of L, i.e., the vehicle tends to over-steer or under-steer.

It is an object of the present invention, therefore, to provide means enabling such potential disadvantage to be avoided.

A more specific object of the present invention is the provision novel constructions of radial ply tires, as well as novel methods of manufacturing such tires, by means of which the force of structure F of each tire is effectively counterbalanced at all times by the force of conicity C of the same tire.

Generally speaking, these objectives of the invention are achieved by building the tire in such a way that with the force of structure F always directed in a single direction, i.e., positive or negative, regardless of the actual direction of mounting of the tire on the wheel rim, the force of conicity is always vectorially opposite to the force F regardless of the direction of rotation of the wheel. The sufficient condition is then expressed by the relation (4) $\quad L=(\pm F)+(\pm C)=0$ although it would be preferred if the magnitude of C were greater than the magnitude of F.

In accordance with our invention, this objective is basically attained by the provision of means in the tire, constituting a part of the structure thereof, of an asymmetry of the geometry of the tire sufficient to cause a difference in the resistance of the respective sidewalls to deflection in service.

We are, of course, aware of the fact that asymmetrical tire constructions have heretofore been proposed for various reasons. We believe, however, that all such known constructions have been devised to affect, and are capable of affecting, only the force of structure F, particularly to the end of increasing that force, and have not in any way been devised to create a vectorially opposite force of conicity C through the creation of a predetermined difference between the deflection characteristics of the two sidewalls of a tire.

Basically, a tire according to the present invention, which includes a radial ply carcass, a tread, a breaker forming the reinforcement for the tread, and two sidewalls, is characterized by the fact that the effectiveness of the reinforcement means in one sidewall differs from the reinforcement means in the other sidewall.

In accordance with one aspect of the present invention, therefore, the tire is molded asymmetrically with respect to its equatorial plane, the curvature of one sidewall being greater than that of the other. According to another aspect of the present invention, the sidewalls are composed of respective rubber stocks of different moduli. According to a third aspect of the present invention, the thickness of one sidewall is different from the thickness of the other. According to a fourth aspect of the present invention, the carcass reinforcing the sidewalls is constituted at least in part by two ply sections either interrupted or joined under the breaker, each ply section being composed of a cord material the elongation characteristics of which differ from those of the cord material used in the other ply section. According to a fifth aspect of the present invention, the number of reinforcement plies in one sidewall is different from that in the other sidewall.

The foregoing and other objects, characteristics and advantages of the present invention will be more clearly understood from the following detailed description thereof when read in conjunction with the accompanying drawings, in which:

FIGS. 2, 3 and 4 are similar views of other types of tires embodying a variant of the present invention and illustrate the tires before and after a post-cure treatment through which the desired asymmetry is achieved; and FIG. 4A is a similar view of the type of tire shown in FIGS. 3 and 4 but having an asymmetry which is a somewhat modified version of that shown in FIG. 4.

Figure 1:
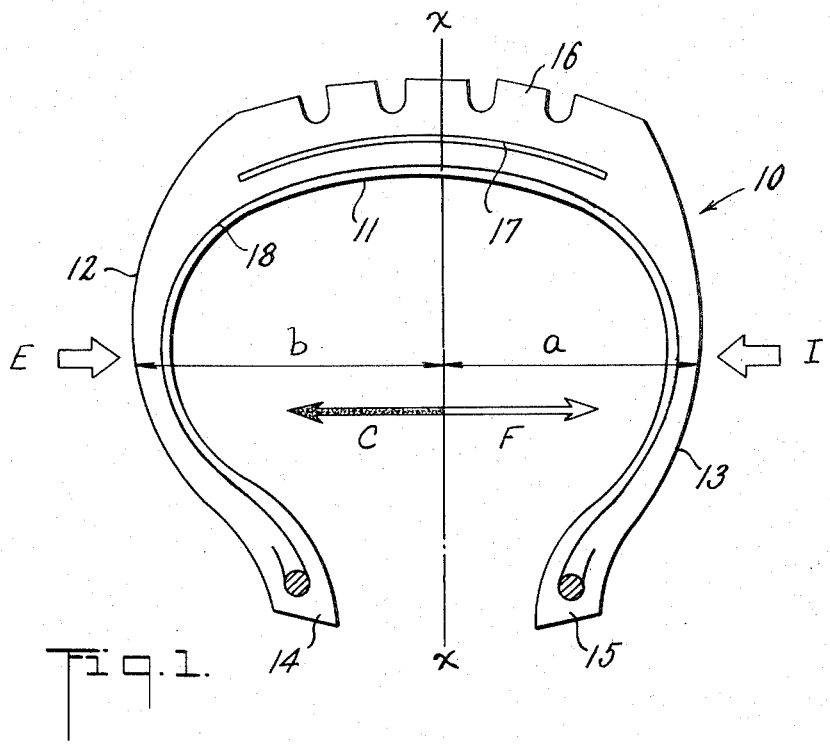
FIG. 1 is a diagrammatic transverse or radial section through an illustrative type of tire provided with an asymmetrical structure according to the basic principles of the present invention.

Referring now to the drawings in greater detail, FIG. 1 illustrates a radial ply tire 10 comprising a carcass 11, sidewalls 12 and 13 terminating at their radially inwardmost ends in beads 14 and 15, respectively, a tread 16 surrounding the crown portion of the carcass, and a breaker or belt 17 interposed between the carcass and the tread to reinforce the latter. The carcass 11 is composed of one or more plies of rubberized tire fabric 18 in each of which the cord elements (of metallic wires, or of filaments of nylon, polyester, glass, etc.) extend at an angle of between about 80° and 90° to the median equatorial plane x—x of the tire.

As is well known, the breaker 17 may be either a single ply or a multi-ply structure, composed of usually weftless rubberized cord fabric in which the generally inextensible cord elements are made either of metallic wires or of suitable synthetic non-metallic filaments of glass, nylon, polyester, and the like. Such cord elements are oriented generally circumferentially of the tire and are said to have a low bias angle (the angle between their direction of orientation and the median equatorial plane x—x of the tire). For truly circumferential breaker cords, the bias angle thus is zero, but in practice the breaker cords are usually oriented at a small angle to the median equatorial plane x—x of the tire (in a multi-ply breaker the cords in successive plies are oriented at opposite low bias angles). As previously indicated, it is principally the bias angle of the radially outermost breaker ply which imparts to the tire its force of structure F, and in FIG. 1 this force is assumed to be directed as shown by the relatively long clear arrow toward the sidewall 13 which, designated by a relatively short clear arrow I, is to be the inner sidewall of the tire 10 when the latter is in use, i.e., the sidewall which will face inwardly of the vehicle on which the tire is mounted.

In accordance with one aspect of the present invention, to achieve the object of imparting to the tire 10 the eccentricity or asymmetry needed to ensure the creation of the force of conicity C vectorially opposed, as indicated by the dark arrow in FIG. 1, to the force of structure F, the outer sidewall 12, designated by the short clear arrow E, is provided with a greater curvature than the inner sidewall 13. This is graphically represented in FIG. 1 by the difference between the dimensions $a$ and $b$. By virtue of such a construction, it will be readily understood, the outer sidewall of the tire will have a lower resistance to deflection under load than the inner sidewall, which is manifested under load by a slight inclination of the tread 16 toward the outside of the vehicle, i.e., so that the plane of contact between the surface of the tread and the road is not truly perpendicular to the median plane x—x of the tire. Similar results, albeit to a lesser degree, may be achieved, in accordance with other aspects of the present invention, by utilizing rubber stocks of appropriately different moduli in the manufacture of the sidewalls 12 and 13, or by making the sidewalls of appropriately different thicknesses.

Nevertheless, we have found that the objectives of our invention can be attained more readily and to greater advantage through the use of a constitutive asymmetry of the carcass of the tire, e.g., by making the reinforcement for the outer sidewall less stretchable than the reinforcement for the inner sidewall. Thus, the tire 10a shown in FIG. 2 (parts of which identical to those of the tire 10 in FIG. 1 are designated by the same reference numerals) comprises a radial ply carcass 11a which is constructed of an inner ply 18 having cord elements made of nylon filaments, for example, and an outer ply defined by separate ply sections 19 and 20 of cord fabric joined to each other along the median plane x—x under the breaker 17, the cord elements in the section 19 at the outer sidewall 12 being made of rayon filaments R, and the cord elements in the section 20 at the inner sidewall 13 being made of nylon filaments N. On the other hand, the tire 10b shown in FIG. 3 comprises a radial ply carcass which is interrupted under the breaker 17, i.e., constructed of separate ply sections 21 and 22 at the outer and inner sidewalls, respectively, and made of rayon and nylon tire cords, respectively. It should be understood, of course, that other cord material combinations for the plies 19–20 and 21–22 are also possible, subject only to the requirement that the cord material used for the ply section 19 or 21 to be incorporated in the outer sidewall 12 be less stretchable than the cord material used for the ply section 20 or 22 to be incorporated in the inner sidewall 13. It will also be apparent that alternatively the requisite differential instretchability can be achieved even when only one type of cord material, e.g., nylon, is used throughout the carcass, or when the cord material in the outer sidewall ply section is more stretchable than the cord material in the inner sidewall ply section, by incorporating a suitably greater number of ply sections (not shown) in the outer sidewall than in the inner sidewall.

Figure 2:
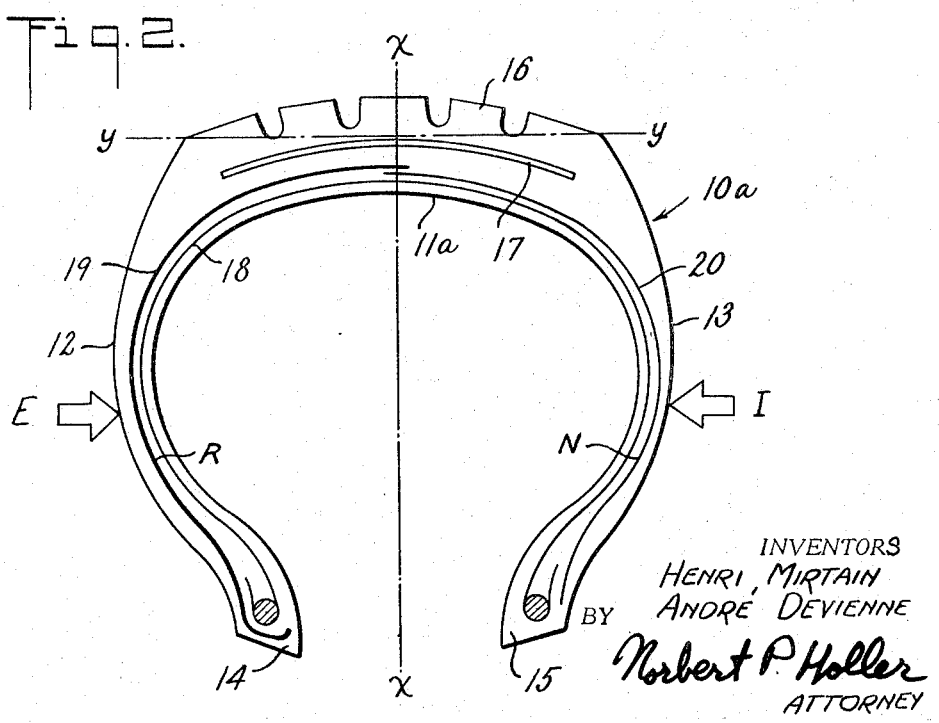

As will be clear to those skilled in the art, therefore, when such a tire is being shaped and cured, the tread and breaker region thereof is by and large symmetrical with respect to the median equatorial plane x—x of the tire. This condition is indicated in FIGS. 2 and 3 by the dot-dash lines y—y extending through the respective pairs of shoulders of the tires 10a and 10b at right angles to the planes x—x. Thereafter, at the end of the curing cycle, the tire is removed from the press or mold and is immediately post-inflated while still hot. The inner sidewall structure of the tire will thus be stretched somewhat more than the outer sidewall structure, e.g., due to the use of nylon cords N in the former and rayon cords R in the latter, whereby the tread and breaker region assumes a somewhat conical shape in cross-section, shown in FIG. 4, for the sake of simplicity, only for the tire 10b. This condition is indicated in FIG. 4 by the dot-dash line y–y' extending through the shoulders of the tire at a small angle to the line y—y which is still shown as perpendicular to the plane x—x. Accordingly, since the radius of the tread and breaker region, as measured from the axis of rotation of the tire, is less at the outer sidewall than at the inner sidewall, the resulting eccentricity or asymmetry of the tire ensures that the latter, when in use, will be subjected to a lateral force C, i.e., the force of conicity, directed oppositely to the force of structure F and of sufficient magnitude effectively to counterbalance the same.

FIG. 4A shows a possible variant of the foregoing, in which the tire 10c differs from the tire 10b only in that the outer sidewall 12a is made somewhat thicker than the inner sidewall 13 to help accentuate the difference in the stretchability or the resistance to deflection thereof, it being understood that such a difference in sidewall thickness may be applied as well to tires of the type designated 10a in FIG. 2, to tires using different numbers of carcass plies (whether of the same or different cord materials) in the respective sidewalls, and to tires using rubber stocks of different moduli in the respective sidewalls.

By means of the present invention, therefore, we are able to produce tires each having a supplied and predeterminable geometrical asymmetry the operational result of which is a force of conicity sufficient effectively to counterbalance the inherent and invariable force of structure of the tire. The term "invariable" is here used only to denote the fact that in any tire manufacturing run all tires of a sequential set will generally utilize the same breaker fabric and construction, and will have the breaker applied in essentially the same way; quite obviously, differences in tire building techniques, such as changes in or even reversals of the bias angle of the cords in the outermost breaker ply, etc. may yield different magnitudes and vectorial directions of the force of structure F. Since each tire according to our invention will be clearly marked to designate which sidewall is the inner and which the outer, each set of tires on a given vehicle may then be so mounted that the paired and generally oppositely directed resultants L of the forces F and C will cancel each other, thereby providing a more stable handling of the vehicle, especially during cornering, by virtue of the substantial minimization of the tendency of the set of tires to exert a lateral drag on the vehicle. Moreover, our invention is of substantial importance to the tire manufacturer from the standpoint of economies, since the imposition of a deliberately chosen eccentricity or asymmetry on each tire produced will appreciably reduce the number of tires in any given manufacturing run which will have to be rejected as unfit for actual use due to the fact that more tires can be matched up for paired use on a vehicle.

It is to be understood that the foregoing description is illustrative only, and that the various tire constructions disclosed herein are susceptible to a number of variations and modifications none of which involves a departure from the spirit and scope of the present invention as defined in the hereto appended claims.

Having thus described our invention, what we claim and desire to secure by Letters Patents is:

1. A pneumatic tire, comprising a carcass constituted by at least one ply of substantially radially oriented tire cords, sidewalls reinforced by said carcass, a tread surrounding the crown region of said carcass, a breaker interposed between said carcass and said tread, said breaker being comprised at its radially outermost region of generally inextensible tire cords oriented at a small angle to the median equatorial plane of the tire thereby to impart to the latter when in service on a moving vehicle a force of structure directed at all times toward the same one of the sidewalls of the tire irrespective of the direction of mounting of the latter on the wheel rim, and means constituting a part of the structure of the tire to establish in the same an asymmetry of its geometry thereby to impart to the tire when in service on a moving vehicle a force of conicity directed at all times opposite to said force of structure irrespective of the direction of rotation of the tire and having a magnitude sufficient effectively to counterbalance said force of structure.

2. A tire according to claim 1, said means comprising the provision of sidewalls having different curvatures.

3. A tire according to claim 1, said means comprising the provision of sidewalls having different thicknesses.

4. A tire according to claim 1, said means comprising the provision of sidewalls made of rubber stocks having different moduli.

5. A tire according to claim 1, said means comprising the provision of sidewalls reinforced by different numbers of carcass plies.

6. A tire according to claim 1, said means comprising the provision of sidewalls reinforced by respective carcass ply sections the cord elements of which are made of materials having different stretchability characteristics.

7. A tire according to claim 6, wherein the cord elements in one of said ply sections are made of rayon and in the other of said ply sections of nylon.

8. A tire according to claim 6, wherein said ply sections are united with each other under said breaker.

9. A tire according to claim 6, wherein said ply sections are interrupted under said breaker.

10. A tire according to claim 6, wherein said cord elements are stretched different amounts to impart to the tire an asymmetric profile.

References Cited

UNITED STATES PATENTS

| | | | |
|---|---|---|---|
| 2,281,359 | 4/1942 | Kenner | 152—352 |
| 3,162,229 | 12/1964 | Ellenrieder | 152—209 |
| 3,231,000 | 1/1966 | Massoubre | 152—361 |

FOREIGN PATENTS

| | | |
|---|---|---|
| 377,211 | 6/1964 | Switzerland. |
| 1,254,263 | 1/1961 | France. |

ARTHUR L. LA POINT, *Primary Examiner.*

CHARLES B. LYON, *Assistant Examiner*